US012521978B2

(12) United States Patent
Wada et al.

(10) Patent No.: US 12,521,978 B2
(45) Date of Patent: Jan. 13, 2026

(54) MASK DELIVERY DEVICE AND MASK CONVEYANCE SYSTEM PROVIDED WITH SAME

(71) Applicant: YAMAHA HATSUDOKI KABUSHIKI KAISHA, Iwata (JP)

(72) Inventors: Masashi Wada, Shizuoka (JP); Takuma Hanji, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/851,030

(22) PCT Filed: Mar. 29, 2022

(86) PCT No.: PCT/JP2022/015350
§ 371 (c)(1),
(2) Date: Sep. 25, 2024

(87) PCT Pub. No.: WO2023/187962
PCT Pub. Date: Oct. 5, 2023

(65) Prior Publication Data
US 2025/0214332 A1 Jul. 3, 2025

(51) Int. Cl.
*B41F 15/12* (2006.01)
*B41F 15/36* (2006.01)
*B41F 33/16* (2006.01)

(52) U.S. Cl.
CPC .............. *B41F 15/12* (2013.01); *B41F 15/36* (2013.01); *B41F 33/16* (2013.01)

(58) Field of Classification Search
None
See application file for complete search history.

(56) References Cited

U.S. PATENT DOCUMENTS 11,801,673 B2 * 10/2023 Vasic ...................... B41F 15/36
2012/0216384 A1 8/2012 Immekus
2021/0178681 A1 6/2021 Vasic et al.

FOREIGN PATENT DOCUMENTS

JP H06-087205 A 3/1994
JP 2000-071417 A 3/2000
JP 2013-193158 A 9/2013
JP 2021-502282 A 1/2021
WO 2021/177311 A1 9/2021

OTHER PUBLICATIONS

International Search Report issued in PCT/JP2022/015350; mailed May 31, 2022.

* cited by examiner

*Primary Examiner* — Joshua D Zimmerman
(74) *Attorney, Agent, or Firm* — Studebaker Brackett PLLC

(57) ABSTRACT

A mask delivery device of the present invention is a device that transfers a mask used when printing solder on a substrate to an accommodating unit that accommodates the mask. The mask delivery device includes a mobile mechanism including a guide extending in a fixed direction along one surface of the accommodating unit having an opening for loading and unloading the mask and a mobile body moving along the guide; and a multijoint robot supported by the mobile body to transfer the mask between the accommodating unit and a placement location away from the accommodating unit.

20 Claims, 12 Drawing Sheets

MASK DELIVERY DEVICE AND MASK CONVEYANCE SYSTEM PROVIDED WITH SAME

CROSS-REFERENCE TO RELATED APPLICATION

This application claims benefit of priority to International Patent Application No. PCT/JP2022/015350, filed Mar. 29, 2022, the entire contents of which are incorporated herein by reference.

BACKGROUND

Technical Field

The present disclosure relates to a mask delivery device for delivering a mask used for printing solder on a substrate and a mask conveyance system provided with the same.

Background Art

On a substrate where electronic components are to be mounted, cream solder, which is solder in paste form, is pre-applied to areas where the electronic components will be mounted. As a device for applying cream solder to a substrate, a cream solder printer is known. In the cream solder printer, generally, a sheet-like mask having mask openings corresponding to a predetermined printing pattern is used. That is, cream solder is supplied over the mask that has been overlaid on the surface of the substrate, and the supplied cream solder is spread by a squeegee, whereby the cream solder is printed onto the substrate through the mask openings.

In a substrate manufacturing site, generally, a plurality of types of masks is used according to the type of substrate to be manufactured. For example, a storage shelf for storing various masks is facilitated, and the required masks are unloaded from the storage shelf and used in the cream solder printer. In this case, after being unloaded from the storage shelf, the masks pass through the cream solder printer, a washing area, and an inspection area, and then are returned to the storage shelf again. The greater the variety of masks, the more frequently the masks are moved in and out of the storage shelf. Therefore, there is a demand for technology that can efficiently transfer masks to and from the storage shelf.

JP H06-87205 A discloses a plate cylinder exchange device for exchanging a plate cylinder used for gravure printing, which is not technology related to mask transfer, though. Specifically, the plate cylinder exchange device of JP H06-87205 A includes a storage shelf (storage unit) that stores the plate cylinder, a pallet conveyance means to convey pallets carrying the plate cylinder between the entrance/exit of the storage shelf and a predetermined transfer station, a plate cylinder exchange trolley capable of moving along a rail through a waiting position lateral to a printer, and a plate cylinder transfer crane that transfers the plate cylinder between the pallet in the transfer station and the plate cylinder exchange trolley.

If masks are transferred using a similar device to JP H06-87205 A described above, that is, if masks are transferred using a transfer crane or exchange trolley with a fixed direction of movement, there is a possibility that the degree of freedom to set the mask transfer route is low and the masks may not be transferred efficiently.

SUMMARY

The present disclosure has been made in view of the circumstances described above, and provides a mask delivery device capable of efficiently transferring masks to an accommodating unit where the masks are accommodated, and a mask conveyance system provided with the same.

A mask delivery device according to one aspect of the present disclosure is a device for transferring a mask used when printing solder on a substrate to an accommodating unit that accommodates the mask, and includes a mobile mechanism including a guide extending in a fixed direction along one surface of the accommodating unit having an opening for loading and unloading the mask; and a mobile body that moves along the guide; and a multijoint robot supported by the mobile body to transfer the mask between the accommodating unit and a placement location away from the accommodating unit.

A mask conveyance system according to another aspect of the present disclosure includes the mask delivery device described above; a mobile conveyance body having a mask mounting part capable of mounting the mask as the placement location; and a conveyance control unit that moves the conveyance body to a predetermined target position when the mask is transferred from the accommodating unit to the mask mounting part by the mask delivery device.

The mask delivery device and the mask conveyance system of the present disclosure can efficiently transfer the mask to the accommodating unit where the mask is accommodated.

DETAILED DESCRIPTION

[Overall Configuration of Mask Conveyance System]

Figure 1:
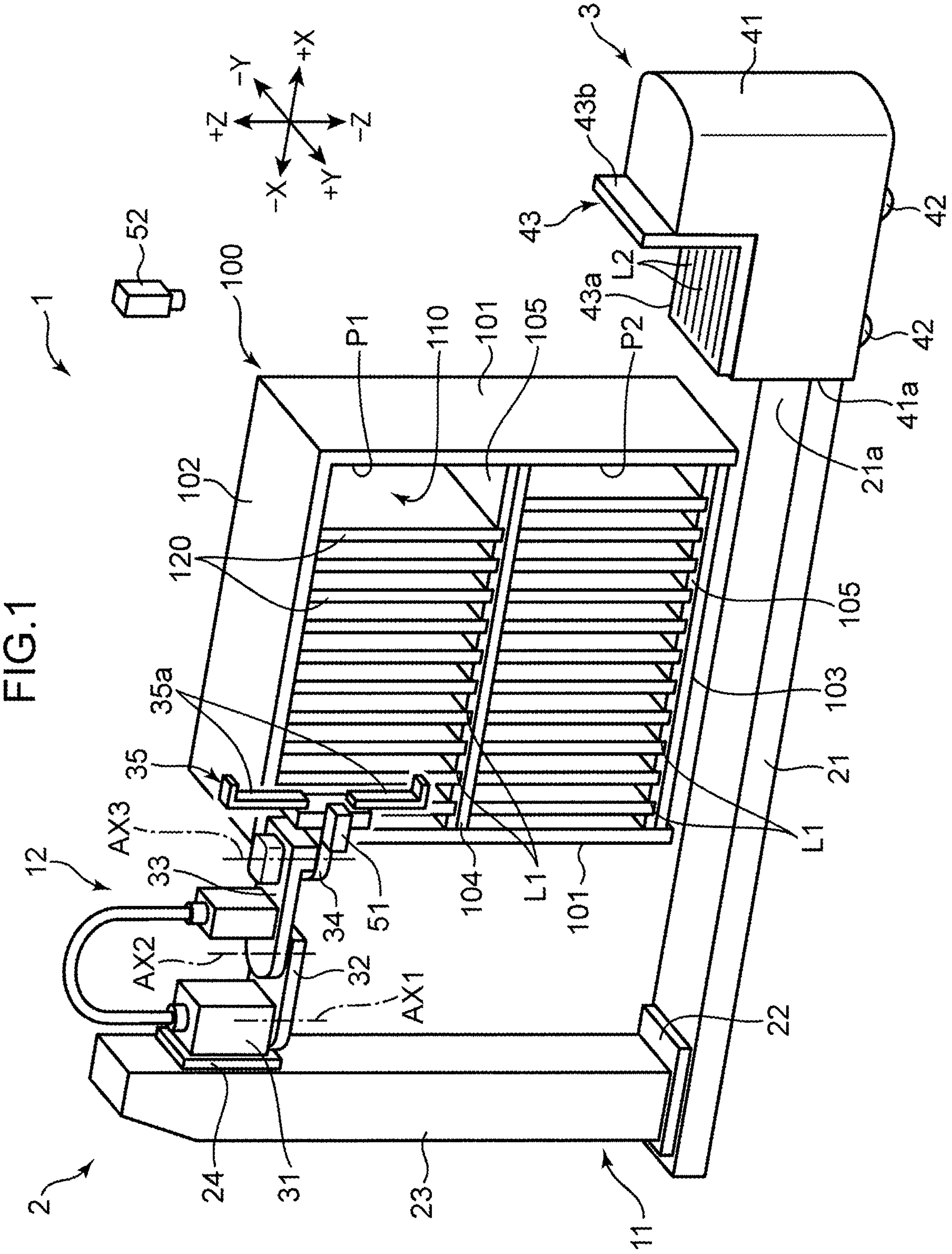
FIG. 1 is a perspective view showing a mask conveyance system according to one embodiment of the present disclosure.
Figure 2:
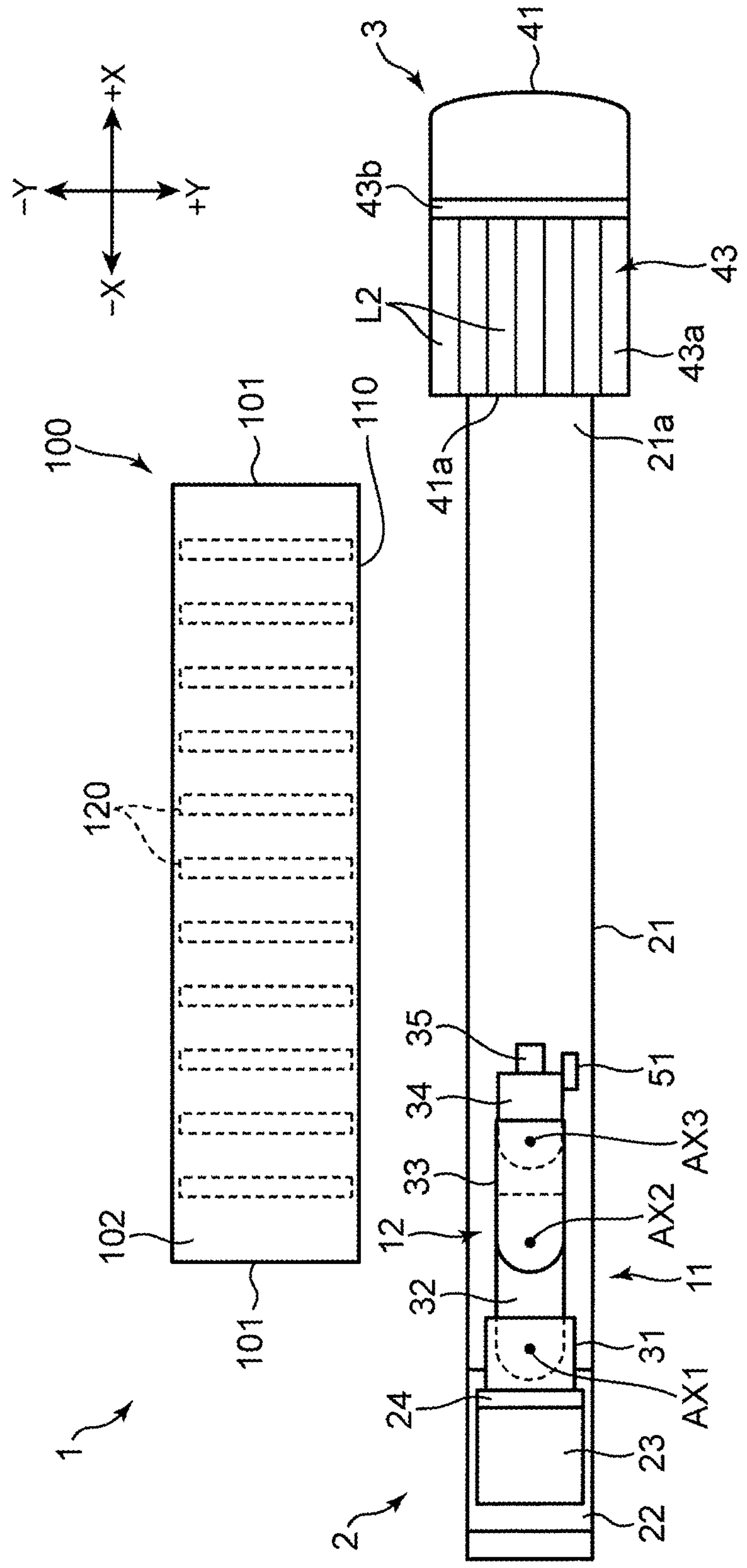
FIG. 2 is a plan view of the mask conveyance system.

FIGS. 1 and 2 are a perspective view and a plan view showing a mask conveyance system 1 according to one embodiment of the present disclosure, respectively. The mask conveyance system 1 shown in these figures is a system that conveys a mask 120 used in a cream solder printer (not shown) (hereinafter simply referred to as a printer). The printer is a device that applies in advance cream solder, which is solder in paste form (hereinafter simply referred to as solder), by printing onto a substrate on which electronic components are mounted. The mask 120 used in the printer is a sheet-like jig having a mask opening corresponding to a predetermined printing pattern. That is, in the printer, the mask 120 is overlaid on the surface of the substrate, and solder is supplied over the mask 120 and spread, whereby the solder is printed onto the substrate through the mask opening. In the present embodiment, the mask conveyance system 1 is used to convey the mask 120 for such applications.

Figure 3:
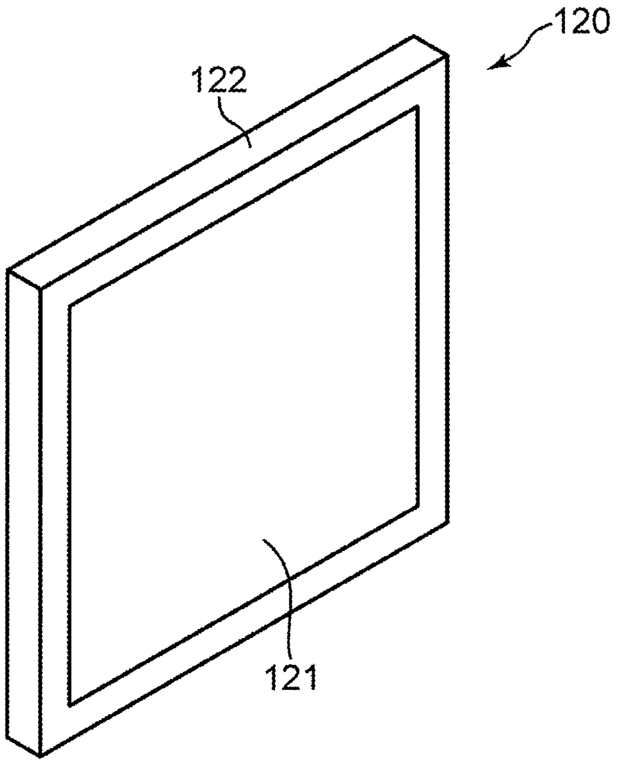
FIG. 3 is a perspective view showing the structure of the mask.

As shown in FIG. 3, the mask 120 includes a mask body 121 and a frame 122 that holds the mask body 121. The mask body 121 is a metal sheet body (metal mask) on which the mask opening is formed. The frame 122 is a frame surrounding the mask body 121 and is formed to have a greater thickness than the mask body 121.

As shown in FIGS. 1 and 2, the mask conveyance system 1 includes a mask delivery device 2 and an AGV 3. The mask delivery device 2 is a device that delivers the mask 120 between an accommodating shelf 100 where the mask 120 is accommodated and the AGV 3. The AGV 3 is an unmanned conveyance vehicle capable of moving between the mask delivery device 2 and the printer or the like. Note that the accommodating shelf 100 corresponds to "accommodating unit" in the present disclosure, and the AGV 3 corresponds to "conveyance body" in the present disclosure.

The accommodating shelf 100 is a shelf having a multi-level (here, two-level) accommodation space divided into upper and lower sections, and is installed on the floor surface on which the AGV 3 travels. As shown in FIG. 1, the accommodating shelf 100 includes one pair of left and right side plates 101, a top plate 102 connecting upper ends of the two side plates 101, a bottom plate 103 connecting near lower ends of the one pair of side plates 101, and a shelf plate 104 connecting the one pair of side plates 101 at a height between the top plate 102 and the bottom plate 103. The side plates 101, the top plate 102, and the shelf plate 104 form an upper-level accommodation space having a rectangular opening P1, whereas the side plates 101, the bottom plate 103, and the shelf plate 104 form a lower-level accommodation space having a rectangular opening P2. Each of the openings P1 and P2 is open forward, which is the side on which the mask delivery device 2 is disposed. In other words, the accommodating shelf 100 includes a front surface 110 with two upper and lower levels openings P1 and P2 formed.

In each of the upper and lower accommodation spaces of the accommodating shelf 100, a plurality of masks 120 is accommodated side by side. The masks 120 can be loaded and unloaded from each accommodation space through the openings P1 and P2 on the front surface 110 of the accommodating shelf 100. A lane member 105 for defining an accommodation position for the mask 120 is attached to each of the upper surfaces of the bottom plate 103 and the shelf plate 104. The lane member 105 includes a plurality of lanes L1 each having a recessed groove corresponding to the width of the mask 120 (in more detail, width of the frame 122), that is, a recessed groove capable of receiving one edge of the mask 120. The masks 120 are accommodated in the accommodating shelf 100 in a state of being aligned at equal intervals on the left and right by being disposed at the prescribed positions by each of these lanes L1.

The mask delivery device 2 includes a mobile mechanism 11 including a Cartesian robot disposed near the front surface 110 of the accommodating shelf 100 and a multijoint robot 12 supported by the mobile mechanism 11.

Here, the direction parallel to the perpendicular axis is defined as the Z-axis direction, the direction parallel to the front surface 110 of the accommodating shelf 100 and orthogonal to the Z-axis direction is defined as the X-axis direction, and the direction orthogonal to both the X-axis and Z-axis directions is defined as the Y-axis direction. The mobile mechanism 11 includes a base 21 extending in the X-axis direction and disposed on the floor surface near the front side (+Y side) of the accommodating shelf 100, a first slider 22 supported by the base 21 movably in the X-axis direction, a tower 23 fixed to the first slider 22 and extending in the Z-axis direction (up-and-down direction), and a second slider 24 supported by the tower 23 movably in the Z-axis direction. That is, the mobile mechanism 11 is a Cartesian robot that can move on the XZ plane near the front side of the accommodating shelf 100.

Although detailed illustrations are omitted, the base 21 includes a guide rail that slidably supports the first slider 22 in the X-axis direction, a first actuator M1 (FIG. 7) that moves the first slider 22 along the guide rail, and a housing that accommodates the first actuator M1 and the like. The first actuator M1 may, for example, include an electric motor that drives a ball screw mechanism or use a linear motor. The first slider 22 is movable on the upper surface of the base 21 over a predetermined range in the X-axis direction in response to driving by the first actuator M1 in the base 21.

The structure of the tower 23 is similar to the structure of the base 21. That is, the tower 23 includes a guide rail that slidably supports the second slider 24 in the Z-axis direction, a second actuator M2 (FIG. 7) that moves the second slider 24 along the guide rail, and a housing that accommodates the second actuator M2 and the like. The second slider 24 is movable on the side surface of the tower 23 (surface on the +X side) over a predetermined range in the Z-axis direction in response to driving by the second actuator M2 in the tower 23.

The multijoint robot 12 is a so-called three-axis SCARA robot, and includes a fixed part 31 fixed to the second slider 24 of the mobile mechanism 11, a first arm 32 pivotally supported by the fixed part 31, a second arm 33 pivotally supported by the first arm 32, a third arm 34 pivotally supported by the second arm 33, and a chuck 35 attached to the tip of the third arm 34.

The first arm 32, the second arm 33, and the third arm 34 are each pivotable around an axis parallel to the Z-axis direction (perpendicular direction). That is, the first arm 32 is pivotable with respect to the fixed part 31 around a perpendicular first axis AX1, the second arm 33 is pivotable with respect to the first arm 32 around a perpendicular second axis AX2, and the third arm 34 is pivotable with respect to the second arm 33 around a perpendicular third axis AX3.

Figure 7:
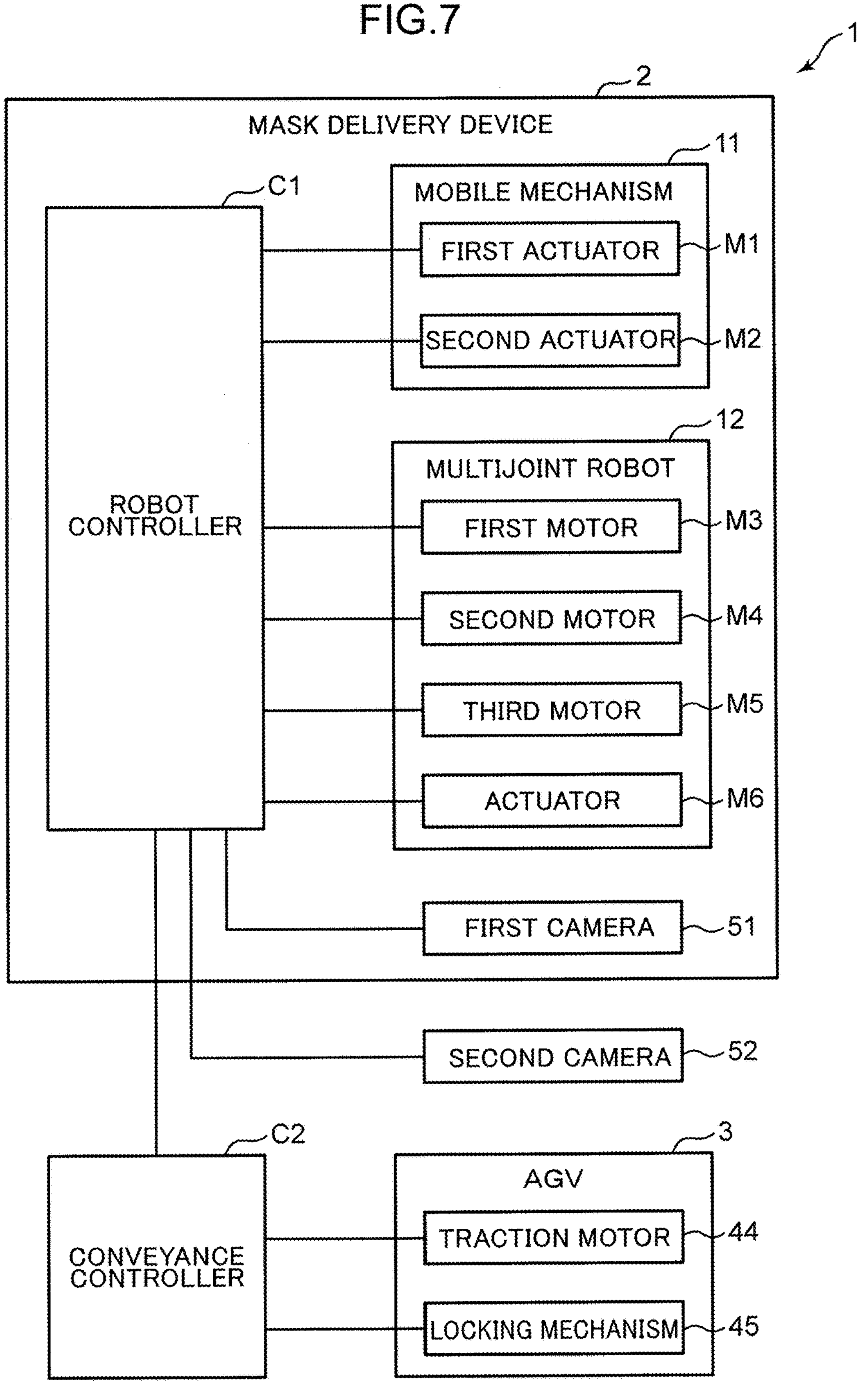
FIG. 7 is a block diagram showing a control system of the mask conveyance system.

As shown in FIG. 7 to be described later, the multijoint robot 12 includes first to third motors M3 to M5, which are drive sources for pivoting the above-described first to third arms 32 to 34. The first motor M3 is a motor that pivots the first arm 32 around the first axis AX1, the second motor M4 is a motor that pivots the second arm 33 around the second axis AX2, and the third motor M5 is a motor that pivots the third arm 34 around the third axis AX3.

Figure 4:
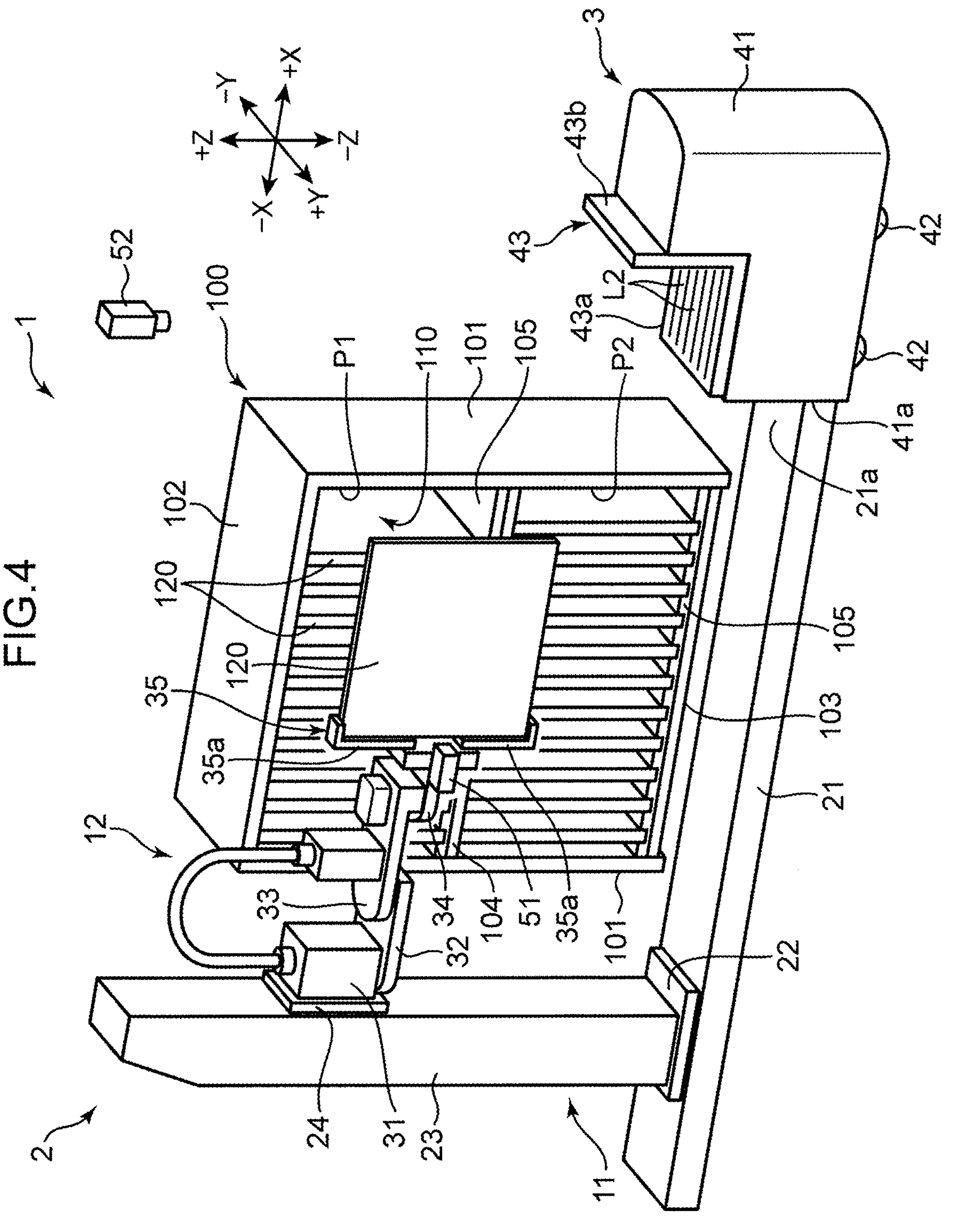
FIG. 4 is a view corresponding to FIG. 1, showing a state in the middle of transferring the mask by a mask delivery device.

The chuck 35 is a holder that holds the mask 120 when loading and unloading the mask 120 from the accommodating shelf 100. The chuck 35 may be of any type as long as the chuck can hold the mask 120. In the present embodiment, as shown in FIG. 4, a type that holds the mask 120 by clamping the mask from above and below is used as the chuck 35. That is, the chuck 35 includes one pair of upper and lower holding pieces 35*a* that can move toward and away from each other, and an actuator M6 (FIG. 7) that changes the distance between the two holding pieces 35*a*.

A first camera 51 is attached to the tip of the multijoint robot 12. The first camera 51 is a camera for capturing an image of an ID code (mask code Q1 and shelf code Q2) to be described later. In the present embodiment, the first camera 51 is attached to a side portion of the third arm 34 at a position adjacent to the chuck 35.

Note that in the above-described mask delivery device 2, the tower 23 supporting the multijoint robot 12 corresponds to "mobile body" in the present disclosure. The base 21 that supports the tower 23 movably in the X-axis direction corresponds to "guide" in the present disclosure.

Figure 5:
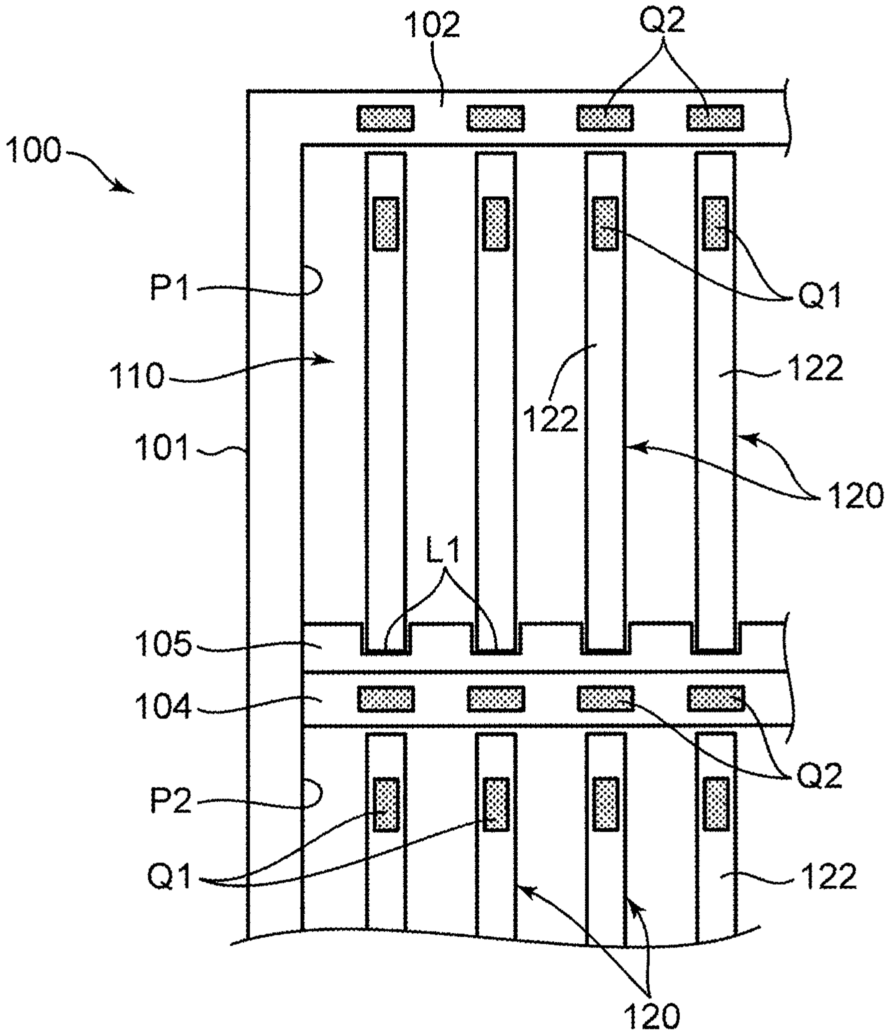
FIG. 5 is an enlarged front view of an accommodating shelf.

FIG. 5 is an enlarged front view of the accommodating shelf 100. As shown in this figure, ID codes (Q1, Q2) are attached to the accommodating shelf 100 and the mask 120 accommodated therein, respectively. That is, the shelf code Q2 is attached to the position corresponding to each lane L1 in the accommodating shelf 100, and the mask code Q1 is attached to the peripheral surface of the mask 120 placed in each lane L1. Specifically, the mask code Q1 is attached to one side surface of the frame 122 of the mask 120 and on the side surface (+Y side) exposed to the front surface 110 of the accommodating shelf 100. The shelf codes Q2 are attached to positions corresponding to each lane L1 on the front surfaces of the top plate 102 and the shelf plate 104 of the accommodating shelf 100. The mask code Q1 is a code given to each type of mask 120 for identifying the type of mask, whereas the shelf code Q2 is a code given to each lane L1 of the accommodating shelf 100 for identifying the accommodation position of the mask 120. Note that the type of mask 120 mentioned here is, for example, a classification in which the mask 120 is classified according to the difference in the pattern of the mask opening formed in the mask body 121.

Figure 6:
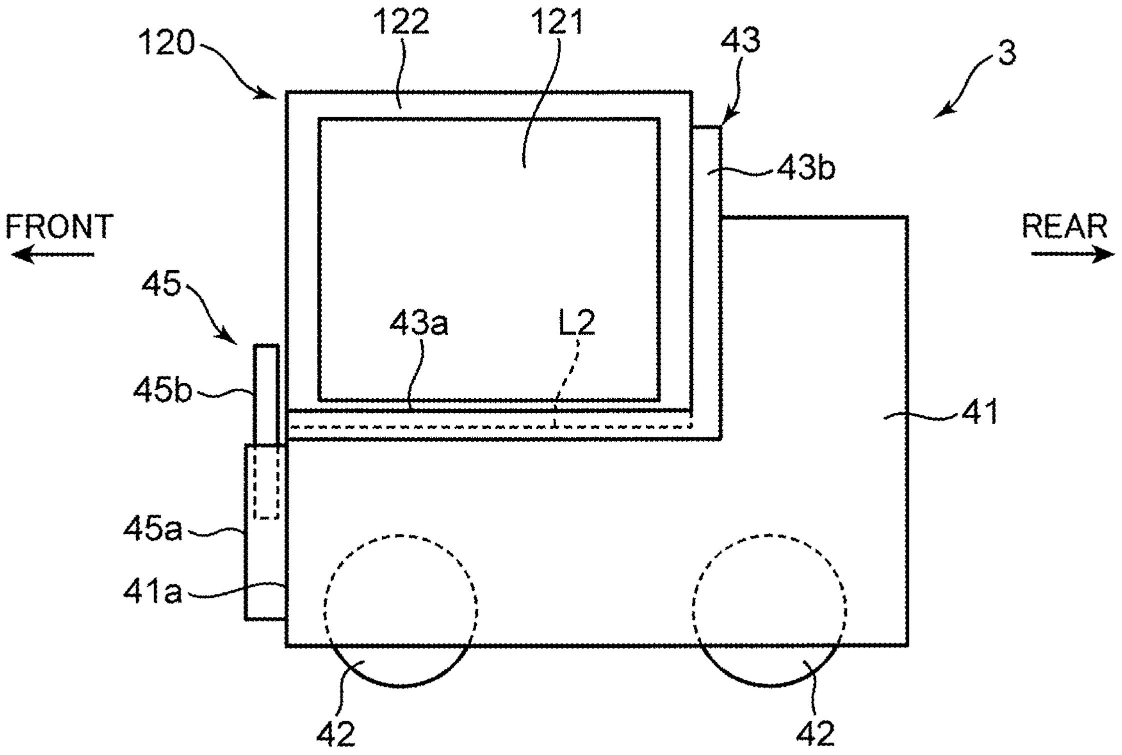
FIG. 6 is a side view of an AGV.

FIG. 6 is a side view of the AGV 3. As shown in FIG. 6 and the previous FIGS. 1 and 2, the AGV 3 includes a car body 41, a plurality of wheels 42 that movably supports the car body 41, a mask mounting part 43 attached to the upper part of the car body 41, a traction motor 44 (FIG. 7) that drives the wheels 42, and a locking mechanism 45 attached to the front of the car body 41. Note that in the present embodiment, the left side in FIG. 6 where the AGV 3 is viewed from the side is defined as the "front" of the AGV 3, whereas the opposite side is defined as the "rear". The direction orthogonal to the paper surface of FIG. 6 is defined as the width direction of the AGV 3.

The mask mounting part 43 is a placement location where the mask 120 transferred to the AGV 3 is placed and is a member for holding the mask 120 in an upright position (see FIG. 6). The mask mounting part 43 is an L-shaped member in side view having a bottom portion 43*a* fixed to the front upper surface of the car body 41 and an upright portion 43*b* extending upward from the rear end of the bottom portion 43*a*. On the bottom portion 43*a*, a plurality of lanes L2 each having a recessed groove corresponding to the width of the mask 120 (in more detail, the width of the frame 122) is formed to be spaced at equal intervals in the width direction of the AGV 3. The mask 120 is held in an upright position at a predetermined position on the mask mounting part 43 by having one edge thereof accommodated in one of the lanes L2.

The locking mechanism 45 is a mechanism for locking the mask 120 mounted on the mask mounting part 43. Specifically, the locking mechanism 45 includes a fixed part 45*a* fixed to a front end surface 41*a* of the car body 41, a locking plate 45*b* slidably supported by the fixed part 45*a*, and an actuator (not shown) that slides the locking plate 45*b* up and down with respect to the fixed part 45*a*. When the mask 120 is locked by the locking mechanism 45, the locking plate 45*b* is slid upward with respect to the fixed part 45*a*, causing the mask 120 on the mask mounting part 43 (bottom portion 43*a*) to be sandwiched and locked between the locking plate 45*b* and the upright portion 43*b*.

As shown in FIGS. 1 and 2, when transferring the mask 120 between the AGV 3 and the accommodating shelf 100, the AGV 3 waits near one end of the base 21 of the mobile mechanism 11. In more detail, the AGV 3 waits in an area on the floor surface axially adjacent to a tip 21*a*, which is the end of the base 21 extending in the X-axis direction on the +X side. In this waiting area, the AGV 3 stops in a posture where the front end surface 41*a* of the car body 41 faces the tip 21*a* of the base 21 such that the mask mounting part 43 approaches the tip 21*a* of the base 21.

As shown in FIG. 1, a second camera 52 is disposed above the AGV 3 that is in the waiting area. The second camera 52 is a camera for capturing an image of the mask mounting part 43 of the AGV 3 to check the availability of the mask mounting part 43.

[Control System]

FIG. 7 is a block diagram showing a control system of the mask conveyance system 1 of the present embodiment. As shown in this figure, the mask delivery device 2 includes a robot controller C1 that controls the operations of the mobile mechanism 11 and the multijoint robot 12. The mask conveyance system 1 includes a conveyance controller C2 that controls the operation of the AGV 3. The robot controller C1 corresponds to "robot control unit" in the present disclosure, and the conveyance controller C2 corresponds to "conveyance control unit" in the present disclosure.

Each of the robot controller C1 and the conveyance controller C2 is a control device with a microcomputer including a processor (CPU) that performs calculations, memories such as ROM and RAM, and various input/output buses as a main part. The robot controller C1 and the conveyance controller C2 are electrically connected by wireless or wire to enable communication with each other. Note that In FIG. 7, the block representing the conveyance controller C2 is expressed outside the block of the AGV 3, but the conveyance controller C2 may be built in the AGV 3.

The robot controller C1 is electrically connected to each unit of the mobile mechanism 11 and the multijoint robot 12. Specifically, the robot controller C1 is electrically connected to the first and second actuators M1 and M2 of the mobile mechanism 11, and is electrically connected to the first motor M3, the second motor M4, the third motor M5, and the actuator M6 of the multijoint robot 12. The robot controller C1 causes the mobile mechanism 11 and the multijoint robot 12 to perform desired operations through the control of these devices. For example, the robot controller C1 controls the actuators M1 and M2 such that the first and second sliders 22 and 24 of the mobile mechanism 11 move to desired positions, respectively. The robot controller C1 controls the motors M3 to M5 such that the first arm 32, the second arm 33, and the third arm 34 of the multijoint robot 12 pivot to desired angles, and controls the actuator M6 to cause the chuck 35 to perform a desired operation such as holding the mask 120.

The robot controller C1 is also electrically connected to the first camera 51 and the second camera 52. Image data captured by the cameras 51 and 52 is each input into the robot controller C1.

The conveyance controller C2 is electrically connected to the traction motor 44 and the locking mechanism 45 of the AGV 3. That is, the conveyance controller C2 controls the traction motor 44 such that the AGV 3 travels along the desired route or stops at the desired position. The conveyance controller C2 controls the actuator built in the locking mechanism 45 such that the locking plate 45*b* of the locking mechanism 45 of the AGV 3 moves up and down as appropriate.

[Control Example]

Figure 8:
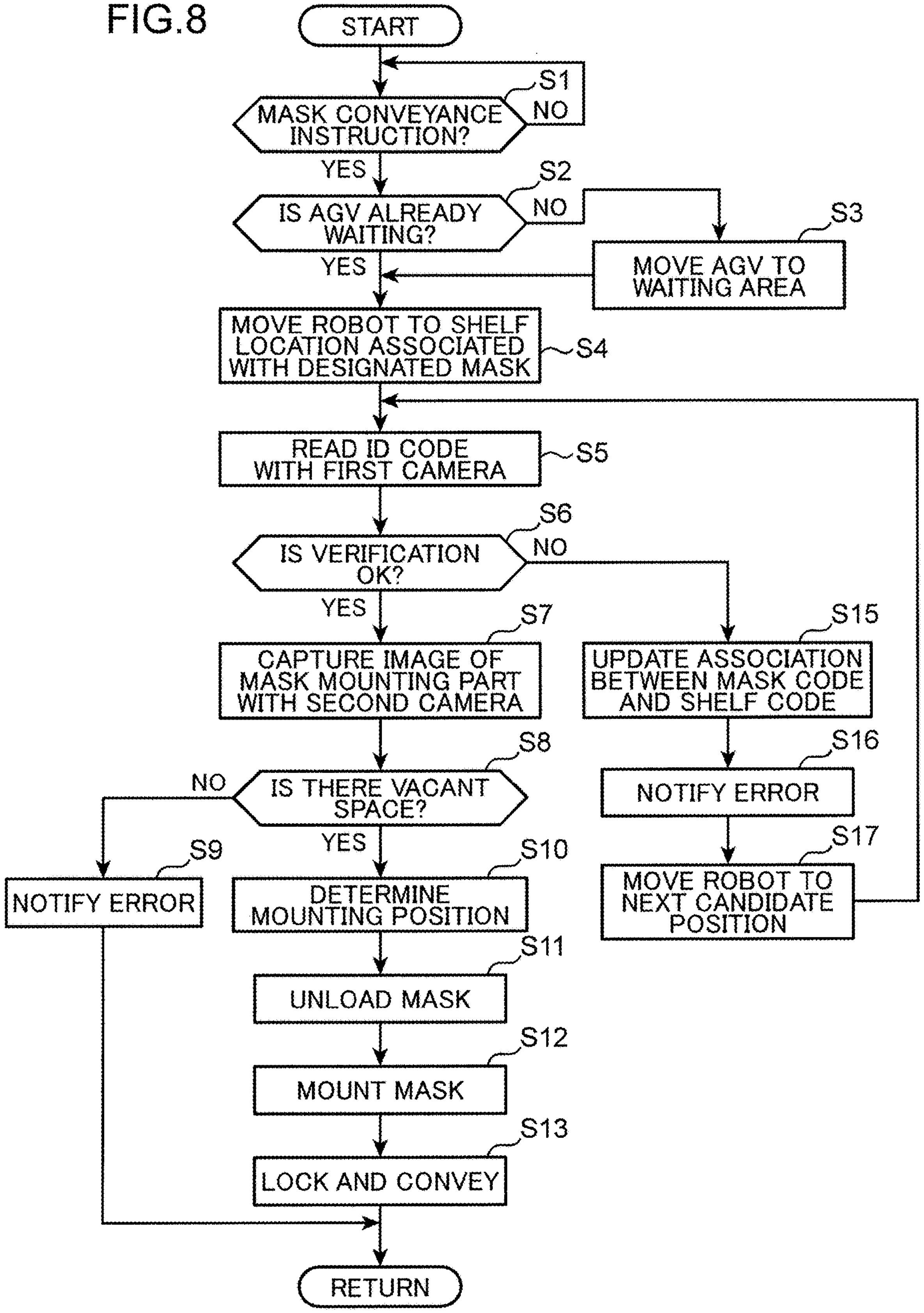
FIG. 8 is a flowchart showing one example of control to transfer the mask between the accommodating shelf and the AGV.

The mask conveyance system 1 having the configuration described above is operated to convey the mask 120 between a plurality of points including the accommodating shelf 100 (FIG. 1), which accommodates the mask 120, and the printer, which prints solder by using the mask 120. As part of the conveyance of the mask 120, control is performed to transfer the mask 120 between the accommodating shelf 100 and the AGV 3. For example, the mask delivery device 2 is used to perform control to unload the mask 120 from the accommodating shelf 100 and transfer to the AGV 3, or control to unload the mask 120 from the AGV 3 and transfer to the accommodating shelf 100. FIG. 8 is a flowchart showing one example of such a transfer control of the mask 120 between the accommodating shelf 100 and the AGV 3. Specifically, FIG. 8 shows the control procedures to be performed by the robot controller C1 and the conveyance controller C2 when transferring the mask 120 from the accommodating shelf 100 to the AGV 3. The control for transferring the mask 120 from the AGV 3 to the accommodating shelf 100 will not be described here because basically only the source and destination of the transfer are swapped.

When the control shown in FIG. 8 starts, the robot controller C1 determines whether an instruction to convey the mask 120 from the accommodating shelf 100 to a predetermined target position has been issued (step S1). Such a conveyance instruction can be issued, for example, through a production management application that oversees the entire substrate production including solder printing and component mounting on the substrate. The target position to which the mask 120 is to be conveyed is typically the printer in which the mask 120 is actually used, but the target position can also be an inspection site where the mask 120 is inspected or a cleaning site where the mask 120 is cleaned.

When the determination in step S1 is YES and the issuance of the mask conveyance instruction is confirmed, the robot controller C1 determines whether the AGV 3 is already waiting (step S2). That is, the robot controller C1 determines whether the AGV 3 has already moved to the waiting area shown in FIGS. 1 and 2 based on communication with the conveyance controller C2 that controls the AGV 3.

When the determination in step S2 is NO and it is confirmed that the AGV 3 is already waiting, the conveyance controller C2 moves the AGV 3 to the waiting area (step S3).

On the other hand, when the determination in step S2 is YES and it is confirmed that the AGV 3 is already waiting, the robot controller C1 moves the multijoint robot 12 to the shelf location associated with the designated type of mask 120, that is, to the lane L1 in the accommodating shelf 100 that accommodates the specific type of mask 120 designated by the instruction to convey in step S1 described above (step S4). This control is performed based on the relationship between the mask code Q1 and the shelf code Q2 that are stored in advance in the storage unit of the robot controller C1.

That is, the storage unit of the robot controller C1 stores map data in which the mask code Q1 and the shelf code Q2 shown in FIG. 5 are associated with each other as data for detecting which type of mask 120 is accommodated in which lane L1 of the accommodating shelf 100. As this map data, default data set at the start of production is used while updated as appropriate. In step S4 described above, the robot controller C1 identifies the lane L1 in the accommodating shelf 100 in which the designated type of mask 120 is accommodated based on the map data, and moves the multijoint robot 12 to the lane L1. In more detail, the robot controller C1 identifies the shelf code Q2 associated with the mask code Q1 corresponding to the designated type of mask 120 from the map data, and identifies the lane L1 corresponding to the identified shelf code Q2 as the lane in which the designated type of mask 120 is accommodated. Then, the multijoint robot 12 is moved to the identified lane L1. For example, when the identified lane L1 is the n-th lane from the left on the upper (or lower) level of the accommodating shelf 100, the multijoint robot 12 is moved to the position of the n-th lane. When there are a plurality of masks 120 of the same type, that is, when there are a plurality of lanes L1 that accommodate the designated type of mask 120, one of the lanes is appropriately selected, and the multijoint robot 12 is moved to the position of the selected lane. Hereinafter, such a lane to which the multijoint robot 12 moves is referred to as "accommodation lane for the designated mask 120" or "destination accommodation lane" as appropriate.

Figure 9A:
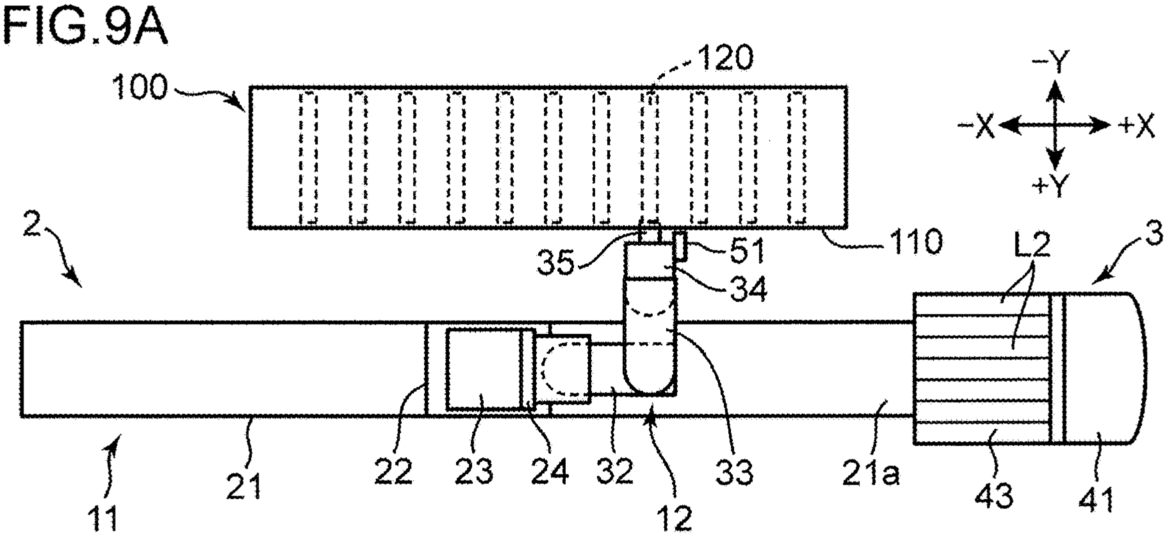
FIG. 9A is a plan view showing a state in which a multijoint robot is moved to a designated mask accommodation position.

FIG. 9A is a plan view showing a state in which the multijoint robot 12 is moved to the accommodation lane for the designated mask 120. As shown in this figure, the robot controller C1 controls the positions of the sliders 22 and 24 of the mobile mechanism 11 and the angles of the arms 32 and 33 of the multijoint robot 12 such that the chuck 35 of the multijoint robot 12 moves to the accommodation lane for the designated mask 120.

Then, the robot controller C1 acquires the ID code of each of the mask 120 and the accommodation lane (step S5). That is, the robot controller C1 controls the first camera 51 attached to the tip of the multijoint robot 12 to capture (acquire) images of the shelf code Q2 attached to the destination accommodation lane (FIG. 5) and the mask code Q1 attached to the mask 120 accommodated in the destination accommodation lane.

Then, the robot controller C1 verifies the mask code Q1 and the shelf code Q2 acquired in step S5 above to determine whether the type of destination mask 120 agrees with the designated type (step S6). That is, the robot controller C1 confirms that the chuck 35 has actually moved to the accommodation lane for the designated mask 120 based on the acquired shelf code Q2, and determines whether the type of mask 120 in the accommodation lane agrees with the designated type based on the acquired mask code Q1.

In the present embodiment, the mask 120 can be loaded and unloaded from the accommodating shelf 100 not only by the mask delivery device 2 but also by, for example, a worker. This means that the accommodation position for the mask 120 can change outside the range recognized by the robot controller C1. Therefore, the robot controller C1 has to verify the type or the like of the destination mask 120 by verifying the ID codes in step S6 above.

When the determination in step S6 is YES and it is confirmed that the type of mask 120 agrees with the designated type, the robot controller C1 captures an image of the mask mounting part 43 of the AGV 3 with the second camera 52 (step S7). That is, the robot controller C1 checks the availability of the mask mounting part 43 based on the image of the bottom portion 43*a* of the mask mounting part 43 (FIG. 1) captured from above with the second camera 52.

Then, the robot controller C1 determines whether there is a vacant space in the mask mounting part 43 (step S8). That is, the robot controller C1 determines whether at least one of the plurality of lanes L2 on the bottom portion 43*a* of the mask mounting part 43 is vacant based on the image captured in step S8 described above.

When the determination in step S8 is NO and it is confirmed that there is no vacant space in the mask mounting part 43, that is, when it is confirmed that all of the plurality of lanes L2 of the mask mounting part 43 are filled with the mask 120, the robot controller C1 performs a predetermined error notification (step S9). The error notification can include, for example, the process of notifying a worker that there is no vacant space in the mask mounting part 43 and the process of displaying a message on a display prompting the worker to take necessary measures.

On the other hand, when the determination in step S8 is YES and it is confirmed that there is a vacant space in the mask mounting part 43, the robot controller C1 determines the position at which the mask 120 is to be mounted on the mask mounting part 43 (step S10). For example, when there are a plurality of vacant lanes L2 in the mask mounting part 43, the robot controller C1 selects appropriate one of the lanes L2 and determines the selected lane as the mounting position for the mask 120.

Figure 9B:
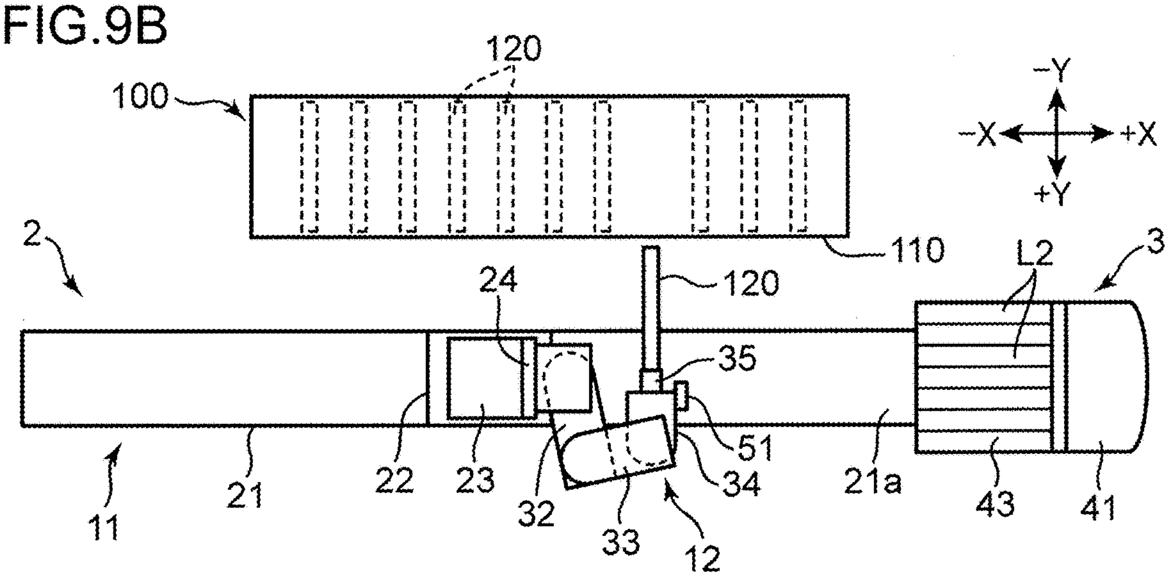
FIG. 9B is a plan view showing a state in which the mask is unloaded from the accommodating shelf.

Then, the robot controller C1 causes the multijoint robot 12 to unload the mask 120 from the accommodating shelf 100 (step S11). That is, as shown in FIG. 9B, the robot controller C1 causes the chuck 35 to hold the mask 120 with the mask code Q1 acquired in step S5 and controls the arms 32 to 34 of the multijoint robot 12 such that the mask 120 held by the chuck 35 moves from the accommodating shelf 100 to the outside thereof. For example, the mask 120 is unloaded from the accommodating shelf 100 by controlling the arms 32 to 34 such that the chuck 35 moves to the +Y side.

Figure 9C:
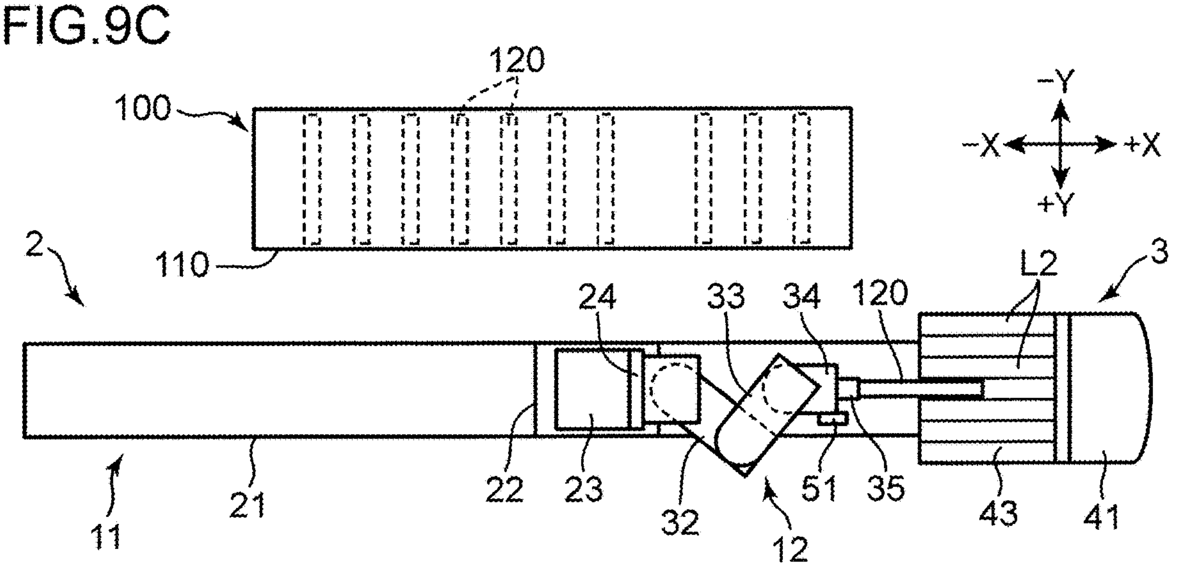
FIG. 9C is a plan view showing a state in which the mask is transferred to the AGV.

Then, the robot controller C1 mounts the mask 120 at the mounting position determined in step S10 (step S12). FIG. 9C is a view showing a state in which the mask 120 is mounted on the mask mounting part 43. As shown in the figure, the robot controller C1 controls the mobile mechanism 11 and the multijoint robot 12 such that the mask 120 moves toward the specific lane L2 that is determined as the mounting position on the mask mounting part 43 to mount the mask 120 on the lane L2.

Through the control in step S12 as described above, the transfer of the mask 120 from the accommodating shelf 100 to the AGV 3 is completed. The robot controller C1 transmits a signal indicating the completion of the transfer to the conveyance controller C2. Then, the conveyance controller C2 performs control to cause the AGV 3 to travel to the target position (step S13). In more detail, the conveyance controller C2 activates the locking mechanism 45 of the AGV 3 (FIG. 6) to lock the mask 120 on the mask mounting part 43, and drives the traction motor 44 in this state to cause the AGV 3 to travel. Through such control by the conveyance controller C2, the AGV 3 automatically travels to the predetermined target position such as the printer.

Next, the control when the determination in step S6 is NO, that is, the control when disagreement about the type of mask 120 is confirmed will be described. The determination of NO here means that the mask code Q1 acquired in the previous step S5 is not of the designated type, or that the mask code Q1 has not been acquired because the destination accommodation lane is vacant. In this case, the robot controller C1 updates the association between the mask code Q1 and the shelf code Q2 (step S15). That is, the robot controller C1 updates the map data that associates the mask code Q1 with the shelf code Q2 to data reflecting the new relationship identified from the data acquired in step S5.

Then, the robot controller C1 performs a predetermined error notification (step S16). For example, the robot controller C1 notifies the worker that the type of destination mask 120 differs from the designated type, and that updating the map data is required accordingly, through displaying messages on a display, or the like.

Then, the robot controller C1 moves the multijoint robot 12 to the next candidate position (step S17). That is, the robot controller C1 identifies another shelf code Q2 associated with the mask code Q1 corresponding to the designated type of mask 120, and moves the chuck 35 of the multijoint robot 12 to the lane L1 corresponding to the other shelf code Q2. After the movement, the process returns to step S5, where the ID code is verified and the subsequent processes are repeated.

[Operational Effects]

As described above, in the present embodiment, the multijoint robot 12 is supported by the mobile mechanism 11, which includes the Cartesian robot disposed on the front side (+Y side) of the accommodating shelf 100, and the mask 120 is transferred between the accommodating shelf 100 and the AGV 3 by using the multijoint robot 12. Such a configuration has an advantage that the mask 120 can be efficiently transferred between the accommodating shelf 100 and the AGV 3.

That is, in the present embodiment, since the mask 120 is transferred using the multijoint robot 12 supported movably along the front surface 110 of the accommodating shelf 100, for example, after unloading the mask 120 from the front surface 110 of the accommodating shelf 100, the mask 120 is rotated as appropriate, the posture of the mask 120 is changed to be aligned with the X axis parallel to the front surface 110 of the accommodating shelf 100 (see FIGS. 4 and 9C), and in this state, the mask 120 can be moved to the AGV 3. Therefore, compared to the case where the mask 120 is moved to the AGV 3 without undergoing such a rotating operation (posture change), that is, compared to the case where the mask 120 is moved to the AGV 120 while maintaining the posture along the Y axis orthogonal to the front surface 110 of the accommodating shelf 100 (see FIG. 9B), the projection area of the mask 120 along the X-axis direction can be reduced, and the possibility that the mask 120 will interfere with an obstacle that may be present near the accommodating shelf 100 can be reduced. Even in a case where the rotating operation of the mask 120 alone cannot avoid interference with an obstacle, the movement route of the mask 120 can be set with a relatively high degree of freedom by controlling the arms 32 to 34 of the multijoint robot 12, and therefore the mask 120 can be moved to the AGV 3 via the shortest possible route while avoiding interference with an obstacle. That is, according to the present embodiment, the mask 120 can be transferred between the accommodating shelf 100 and the AGV 3 via the shortest possible route, and the time required for the transfer can be shortened, thereby improving work efficiency.

In the present embodiment, when unloading the mask 120 from the accommodating shelf 100, images of the mask code Q1 and the shelf code Q2 are captured by the first camera 51 attached to the multijoint robot 12, and the location and type of mask 120 in the accommodating shelf 100 are identified. With such a configuration, it is possible to prevent unloading a mask other than the designated mask 120 or failing to unload the mask 120, and the designated mask 120 can be accurately unloaded from the accommodating shelf 100 and transferred to the AGV 3.

In the present embodiment, after the mask 120 is transferred from the accommodating shelf 100 to the AGV 3 by the multijoint robot 12, the AGV 3 is controlled to automatically travel to the predetermined target position such as the printer, allowing the mask 120 to be appropriately conveyed between the accommodating shelf 100 and the target position.

In the present embodiment, when transferring the mask 120 from the accommodating shelf 100 to the AGV 3, an image of the mask mounting part 43 of the AGV 3 is captured by the second camera 52. Therefore, by checking vacant space in the mask mounting part 43 (lane L2 where the mask 120 is not mounted) based on the captured image, the mask 120 can be appropriately mounted in the vacant space.

In the present embodiment, the AGV 3 is provided with the locking mechanism 45 that locks the mask 120 mounted on the mask mounting part 43. This mechanism prevents the mask 120 from falling off the mask mounting part 43 while the AGV 3 conveys the mask 120 and enables stable conveyance of the mask 120.

Figure 10:
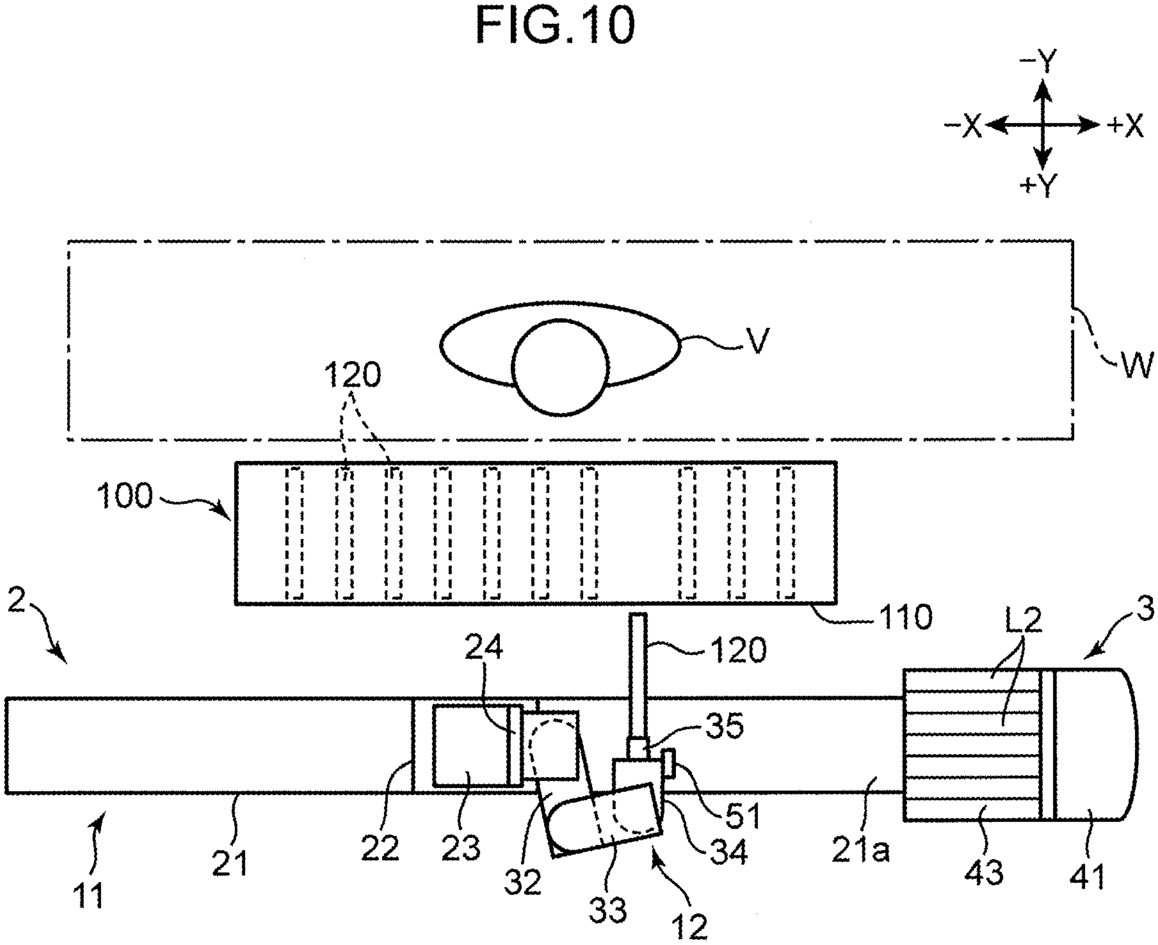
FIG. 10 is a plan view showing one example of layout when the AGV waits in an area axially adjacent to the tip of a base of a mobile mechanism.

In the present embodiment, the waiting area for the AGV 3 to receive the mask 120 from the multijoint robot 12 is set in an area axially adjacent to the tip 21*a* of the base 21 of the mobile mechanism 11 extending in the X-axis direction. This setting makes it possible to reduce the space occupied by the facility including the waiting area for the AGV 3 in the width direction (Y-axis direction) orthogonal to the extension direction of the base 21 (X-axis direction), and make the facility more compact. Therefore, for example, as shown in FIG. 10, this makes it easier to ensure a work space W for the worker V in the area on the rear side (−Y side) of the accommodating shelf 100 opposite the base 21. In other words, in the present embodiment, this makes it possible to reduce the size of the facility in the Y-axis direction while facilitating collaborative work with the worker V.

[Modified Example]

Figure 11:
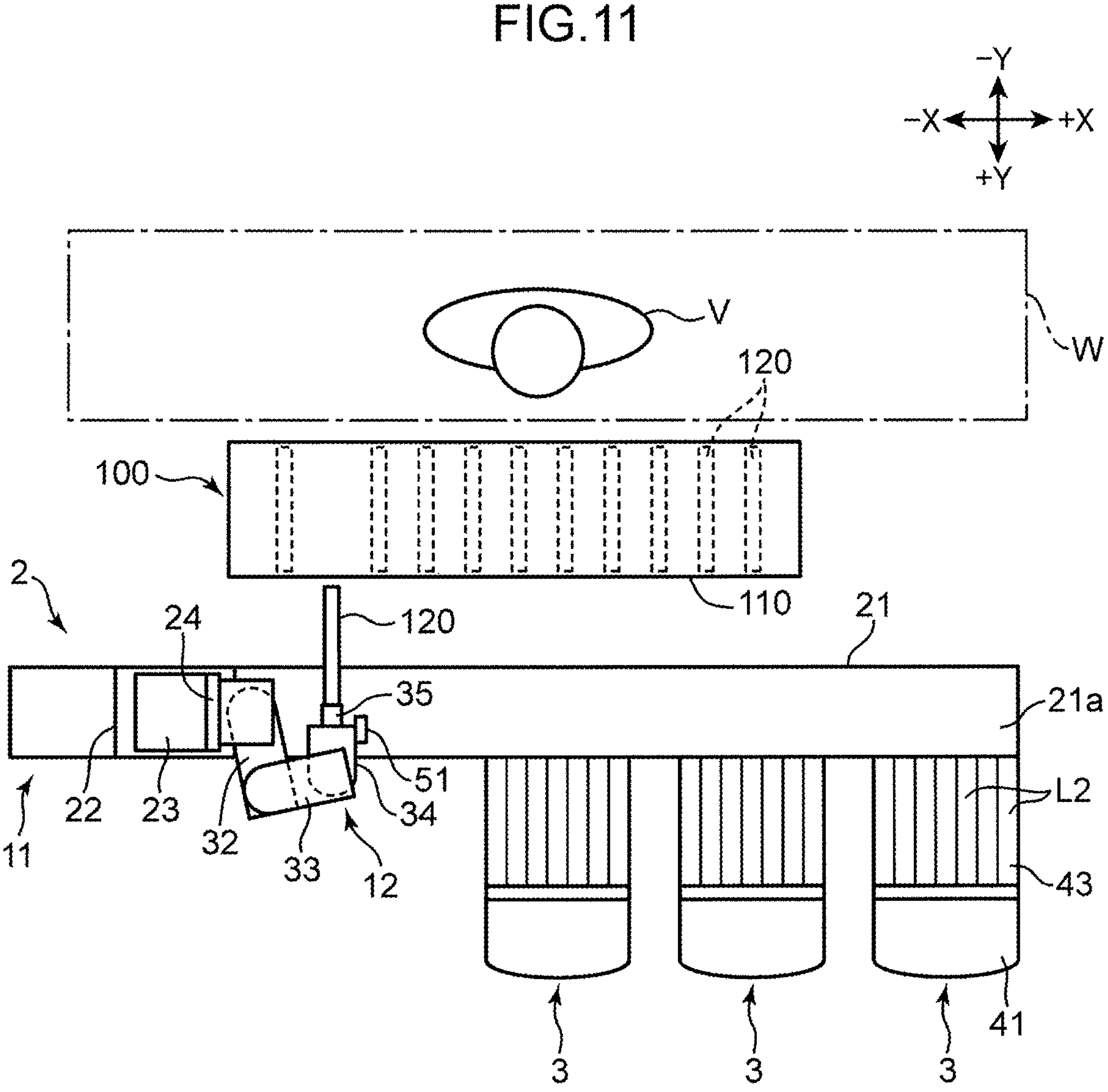
FIG. 11 is a plan view showing one example of layout when the AGV waits in an area lateral to the base of the mobile mechanism.

In the above embodiment, the AGV 3 that comes to receive the mask 120 waits in an area axially adjacent to the tip 21*a* of the base 21 of the mobile mechanism 11 including the Cartesian robot, but the waiting area for the AGV 3 is not limited to this area. For example, as shown in FIG. 11, the AGV 3 may wait in an area lateral to the +Y side of the base 21 (opposite the accommodating shelf 100). In other words, in the modified example of FIG. 11, the accommodating shelf 100 is disposed in an area on one side of the base 21 on the floor surface, and the AGV 3 waits in an area on the other side of the base 21 on the floor surface. In this way, it is possible to cause a plurality of AGVs 3 to wait simultaneously, and to avoid congestion of the AGVs 3.

Figure 12:
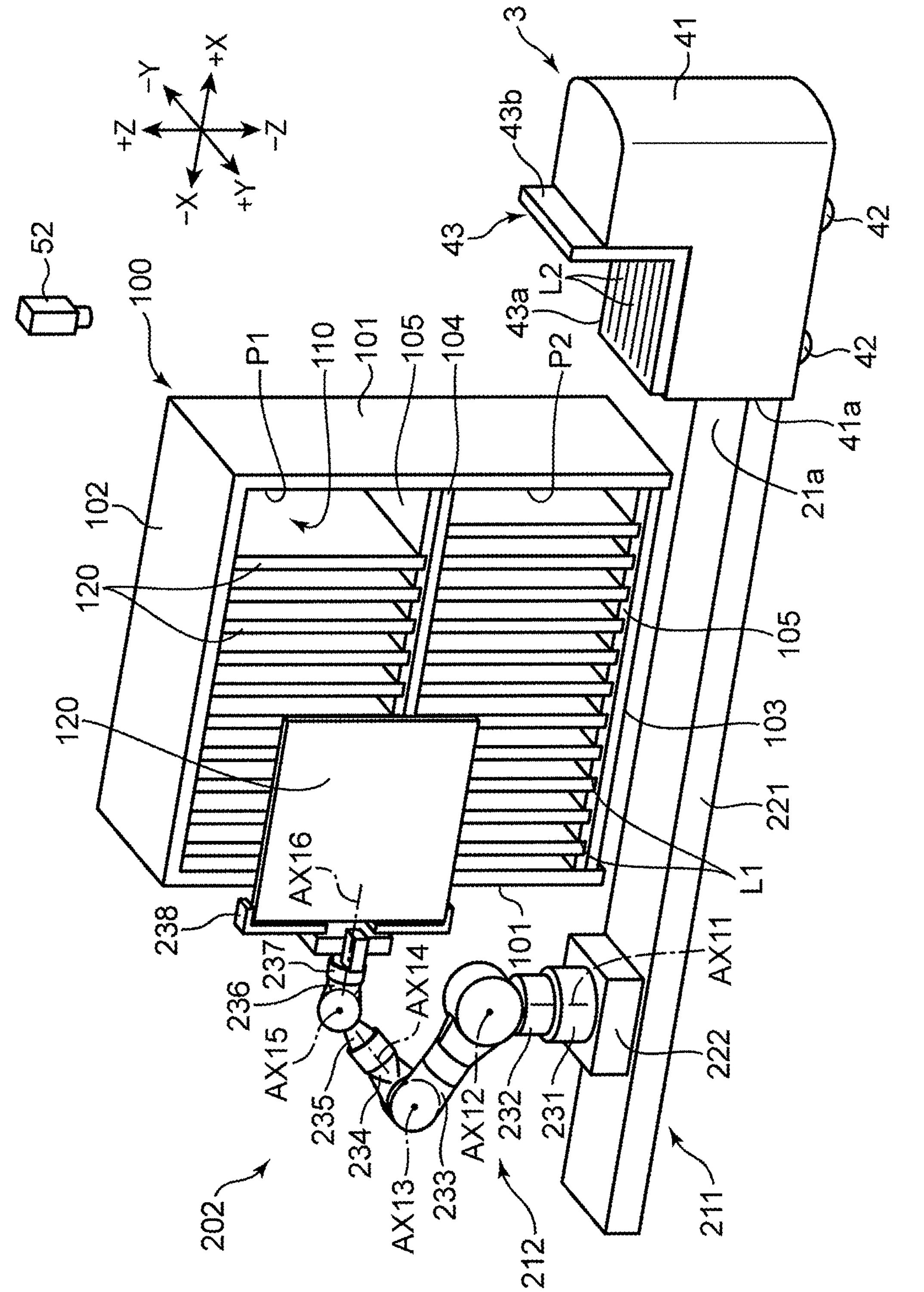
FIG. 12 is a view corresponding to FIG. 1, showing a modified example in which the type of multijoint robot is changed.

In the above embodiment, the three-axis SCARA robot is used as the multijoint robot 12, but the type of multijoint robot that can be used in the present disclosure is not limited to this type. FIG. 12 shows one example in which the type of multijoint robot is changed. A mask delivery device 202 shown in this figure includes a multijoint robot 212 including a six-axis multijoint robot, and a mobile mechanism 211 including a single-axis robot that supports the multijoint robot 212 movably in the X-axis direction. The mobile mechanism 211 includes a base 221 (guide) similar to the base 21 of the above embodiment and a slider 222 (mobile body) supported by the base 221 movably in the X-axis direction. The multijoint robot 212 includes a fixed part 231 fixed to the slider 222, a first arm link 232 rotatable around a first axis AX11 with respect to the fixed part 231, a second arm link 233 swingable around a second axis AX12 with respect to the first arm link 232, a third arm link 234 swingable around a third axis AX13 with respect to the second arm link 233, a fourth arm link 235 rotatable around a fourth axis AX14 with respect to the third arm link 234, a fifth arm link 236 swingable around a fifth axis AX15 with respect to the fourth arm link 235, a sixth arm link 237 rotatable around a sixth axis AX16 with respect to the fifth arm link 236, and a chuck 238 fixed to the sixth arm link 237 as a holder to hold the mask 120. Such a mask delivery device 202 including the multijoint robot 212 also enables efficient transfer of the mask 120 between the accommodating shelf 100 and the AGV 3 in a similar manner to the above embodiment.

In the above embodiment, the mask delivery device 2 is used to transfer the mask 120 between the accommodating shelf 100 and the AGV 3. The mask delivery device in the present disclosure can be widely used for transferring the mask between the location (accommodating unit) where the mask is accommodated and a location (placement location) away from the accommodating unit, and the accommodating shelf 100 and the AGV 3 are just one example. For example, the AGV may be the accommodating unit and the accommodating shelf may be the placement location. The transfer destination for transferring the mask unloaded from the accommodating shelf is not limited to the AGV. For example, the transfer destination may be a second accommodating shelf located away from the accommodating shelf, or the transfer destination may be a work site for the next process of performing a predetermined process on the mask.

[Conclusion]

The above embodiment and the modified example include the following disclosures.

A mask delivery device according to one aspect of the present disclosure is a device for transferring a mask used when printing solder on a substrate to an accommodating unit that accommodates the mask, and includes: a mobile mechanism including: a guide extending in a fixed direction along one surface of the accommodating unit having an opening for loading and unloading the mask; and a mobile body that moves along the guide; and a multijoint robot supported by the mobile body to transfer the mask between the accommodating unit and a placement location away from the accommodating unit.

According to the present disclosure, since the mask is transferred using the multijoint robot supported movably along one surface of the accommodating unit, for example, the mask can be rotated appropriately after being unloaded from one surface of the accommodating unit, and by using the characteristic of the multijoint robot, the mask movement route can be set with a relatively high degree of freedom. Therefore, the mask can be transferred between the accommodating unit and the placement location via the shortest possible route while avoiding interference with an obstacle, and the time required for the transfer can be shortened, thereby improving work efficiency.

Preferably, the mask delivery device further includes: a first camera attached to the multijoint robot; and a robot control unit that controls the multijoint robot to unload the designated mask from the accommodating unit while capturing an image of the accommodating unit and the mask in the accommodating unit with the first camera upon receipt of a request to transfer the mask from the accommodating unit to the placement location.

According to this aspect, it is possible to prevent unloading a mask other than the designated mask or failing to unload the mask, and the designated mask can be accurately unloaded from the accommodating unit and transferred to the placement location.

A mask conveyance system according to another aspect of the present disclosure includes: the mask delivery device described above; a mobile conveyance body having a mask mounting part capable of mounting the mask as the placement location; and a conveyance control unit that moves the conveyance body to a predetermined target position when the mask is transferred from the accommodating unit to the mask mounting part by the mask delivery device.

According to the present disclosure, the conveyance body that has received the mask on the mask mounting part is moved between the accommodating unit and the target position, thereby allowing the mask to be conveyed appropriately.

Preferably, the mask conveyance system further includes a second camera that captures an image of the mask mounting part of the conveyance body waiting at a prescribed position near the guide. The robot control unit controls the multijoint robot to mount the mask unloaded from the accommodating unit on a vacant space in the mask mounting part based on the image captured by the second camera.

According to this aspect, it is possible to check vacant space in the mask mounting part based on the image captured by the second camera to mount the mask appropriately in the vacant space.

Preferably, the conveyance body further includes a locking mechanism that locks the mask mounted on the mask mounting part.

According to this aspect, it is possible to prevent the mask from falling off the mask mounting part when the conveyance body is conveying the mask, enabling stable mask conveyance.

Preferably, the guide is disposed to extend along a floor surface on which the conveyance body moves, the accommodating unit is disposed in an area on one side of the guide on the floor surface, and the conveyance control unit causes the conveyance body that has come to receive the mask to be transferred from the accommodating unit to wait in an area axially adjacent to one end of the guide.

According to this aspect, it is possible to reduce the space occupied by the facility including the waiting area for the conveyance body in the width direction orthogonal to the extension direction of the guide, and make the facility more compact.

The conveyance control unit may cause the conveyance body that has come to receive the mask to be transferred from the accommodating unit to wait in an area on another side of the guide.

According to this aspect, it is possible to cause a plurality of conveyance bodies to wait simultaneously, and to avoid congestion of the conveyance bodies.

The invention claimed is:

1. A mask delivery device for transferring a mask used when printing solder on a substrate to an accommodating unit that accommodates the mask, the mask delivery device comprising:

a mobile mechanism including: a guide extending in a horizontal direction along one surface of the accommodating unit having an opening for loading and unloading the mask; and a mobile body configured to move along the guide;

a multijoint robot supported by the mobile body to transfer the mask between the accommodating unit and a placement location away from the accommodating unit; and a robot controller configured to control the multijoint robot to move the mask toward the placement location with a posture of the mask changed to follow an extension direction of the guide by rotating the mask taken out from the accommodating unit.

2. The mask delivery device according to claim 1, further comprising:

a first camera attached to the multijoint robot, wherein the robot controller is configured to control the multijoint robot to unload the mask from the accommodating unit while capturing an image of the accommodating unit and the mask in the accommodating unit with the first camera upon receipt of a request to transfer the mask from the accommodating unit to the placement location.

3. A mask conveyance system comprising:

the mask delivery device according to claim 1;

a mobile conveyance body having a mask mounting part configured to mount the mask as the placement location; and a conveyance controller configured to move the conveyance body to a predetermined target position when the mask is transferred from the accommodating unit to the mask mounting part by the mask delivery device.

4. The mask conveyance system according to claim 3, further comprising:

a second camera configured to capture an image of the mask mounting part of the conveyance body waiting at a prescribed position near the guide, wherein the robot controller is configured to control the multijoint robot to mount the mask unloaded from the accommodating unit on a vacant space in the mask mounting part based on the image captured by the second camera.

5. The mask conveyance system according to claim 3, wherein the conveyance body further includes a locking mechanism configured to lock the mask mounted on the mask mounting part.

6. The mask conveyance system according to claim 3, wherein the guide is disposed to extend along a floor surface on which the conveyance body moves, the accommodating unit is disposed in an area on one side of the guide on the floor surface, and the conveyance is configured to cause the conveyance body that has come to receive the mask to be transferred from the accommodating unit to wait in an area axially adjacent to one end of the guide.

7. The mask conveyance system according to claim 3, wherein the guide is disposed to extend along a floor surface on which the conveyance body moves, the accommodating unit is disposed in an area on one side of the guide on the floor surface, and the conveyance controller is configured to cause the conveyance body that has come to receive the mask to be transferred from the accommodating unit to wait in an area on another side of the guide.

8. The mask delivery device according to claim 2, wherein before unloading the mask from the accommodating unit, the robot controller is configured to capture images of a mask code given to the mask and a shelf code given to a lane in which the mask is accommodated with the first camera, and verify both codes captured.

9. A mask conveyance system comprising:

the mask delivery device according to claim 2;

a mobile conveyance body having a mask mounting part configured to mount the mask as the placement location; and a conveyance controller configured to move the conveyance body to a predetermined target position when the mask is transferred from the accommodating unit to the mask mounting part by the mask delivery device.

10. The mask conveyance system according to claim 9, further comprising:

a second camera configured to capture an image of the mask mounting part of the conveyance body waiting at a prescribed position near the guide, wherein the robot controller is configured to control the multijoint robot to mount the mask unloaded from the accommodating unit on a vacant space in the mask mounting part based on the image captured by the second camera.

11. The mask conveyance system according to claim 9, wherein the conveyance body further includes a locking mechanism configured to lock the mask mounted on the mask mounting part.

12. The mask conveyance system according to claim 4, wherein the conveyance body further includes a locking mechanism configured to lock the mask mounted on the mask mounting part.

13. The mask conveyance system according to claim 9, wherein the guide is disposed to extend along a floor surface on which the conveyance body moves, the accommodating unit is disposed in an area on one side of the guide on the floor surface, and the conveyance is configured to cause the conveyance body that has come to receive the mask to be transferred from the accommodating unit to wait in an area axially adjacent to one end of the guide.

14. The mask conveyance system according to claim 4, wherein the guide is disposed to extend along a floor surface on which the conveyance body moves, the accommodating unit is disposed in an area on one side of the guide on the floor surface, and the conveyance is configured to cause the conveyance body that has come to receive the mask to be transferred from the accommodating unit to wait in an area axially adjacent to one end of the guide.

15. The mask conveyance system according to claim 5, wherein the guide is disposed to extend along a floor surface on which the conveyance body moves, the accommodating unit is disposed in an area on one side of the guide on the floor surface, and the conveyance is configured to cause the conveyance body that has come to receive the mask to be transferred from the accommodating unit to wait in an area axially adjacent to one end of the guide.

16. The mask conveyance system according to claim 9, wherein the guide is disposed to extend along a floor surface on which the conveyance body moves, the accommodating unit is disposed in an area on one side of the guide on the floor surface, and the conveyance controller is configured to cause the conveyance body that has come to receive the mask to be transferred from the accommodating unit to wait in an area on another side of the guide.

17. The mask conveyance system according to claim 4, wherein the guide is disposed to extend along a floor surface on which the conveyance body moves, the accommodating unit is disposed in an area on one side of the guide on the floor surface, and the conveyance controller is configured to cause the conveyance body that has come to receive the mask to be transferred from the accommodating unit to wait in an area on another side of the guide.

18. The mask conveyance system according to claim 5, wherein the guide is disposed to extend along a floor surface on which the conveyance body moves, the accommodating unit is disposed in an area on one side of the guide on the floor surface, and the conveyance controller is configured to cause the conveyance body that has come to receive the mask to be transferred from the accommodating unit to wait in an area on another side of the guide.

19. The mask conveyance system according to claim 10, wherein the conveyance body further includes a locking mechanism configured to lock the mask mounted on the mask mounting part.

20. The mask conveyance system according to claim 10, wherein the guide is disposed to extend along a floor surface on which the conveyance body moves, the accommodating unit is disposed in an area on one side of the guide on the floor surface, and the conveyance is configured to cause the conveyance body that has come to receive the mask to be transferred from the accommodating unit to wait in an area axially adjacent to one end of the guide.

* * * * *